United States Patent
Candelore

(10) Patent No.: US 8,275,732 B2
(45) Date of Patent: Sep. 25, 2012

(54) HIGH DEFINITION MULTIMEDIA INTERFACE TRANSCODING SYSTEM

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1144 days.

(21) Appl. No.: 11/617,382

(22) Filed: Dec. 28, 2006

(65) Prior Publication Data

US 2007/0133673 A1  Jun. 14, 2007

Related U.S. Application Data

(60) Provisional application No. 60/831,767, filed on Jul. 18, 2006.

(51) Int. Cl.
*G06F 17/00* (2006.01)
*H04N 7/14* (2006.01)
*H04N 5/92* (2006.01)
*H04N 5/93* (2006.01)

(52) U.S. Cl. ........ 706/47; 348/14.12; 386/326; 386/353

(58) Field of Classification Search ............... 348/14.12; 386/326, 353; 706/47
See application file for complete search history.

(56) References Cited

U.S. PATENT DOCUMENTS

| | | | | |
|---|---|---|---|---|
| 7,299,362 B2* | 11/2007 | Shen et al. | ..................... | 713/189 |
| 7,827,312 B2* | 11/2010 | Ramaswamy et al. | ........ | 709/246 |
| 2004/0017916 A1* | 1/2004 | Staddon et al. | ............... | 380/277 |
| 2004/0258389 A1* | 12/2004 | Castillo | .......................... | 386/46 |
| 2005/0135790 A1* | 6/2005 | Hutten | ......................... | 386/125 |
| 2005/0203927 A1* | 9/2005 | Sull et al. | ..................... | 707/100 |
| 2006/0209892 A1* | 9/2006 | MacMullan et al. | .......... | 370/468 |
| 2006/0215651 A1* | 9/2006 | Miller et al. | .................. | 370/389 |
| 2006/0259979 A1* | 11/2006 | Asano | ............................ | 726/27 |
| 2007/0097020 A1* | 5/2007 | Sato | .............................. | 345/3.1 |

FOREIGN PATENT DOCUMENTS

WO    WO 01/63822 A2 *   8/2001

* cited by examiner

*Primary Examiner* — Charles E Anya
(74) *Attorney, Agent, or Firm* — Blakely, Sokoloff, Taylor & Zafman LLP

(57) ABSTRACT

According to one embodiment, a system including a decoder and a high definition multimedia interface (HDMI) whose copy protection protocol has been modified to allow the received uncompressed digital audio-video content from the decoder to be re-encoded and recorded.

17 Claims, 7 Drawing Sheets

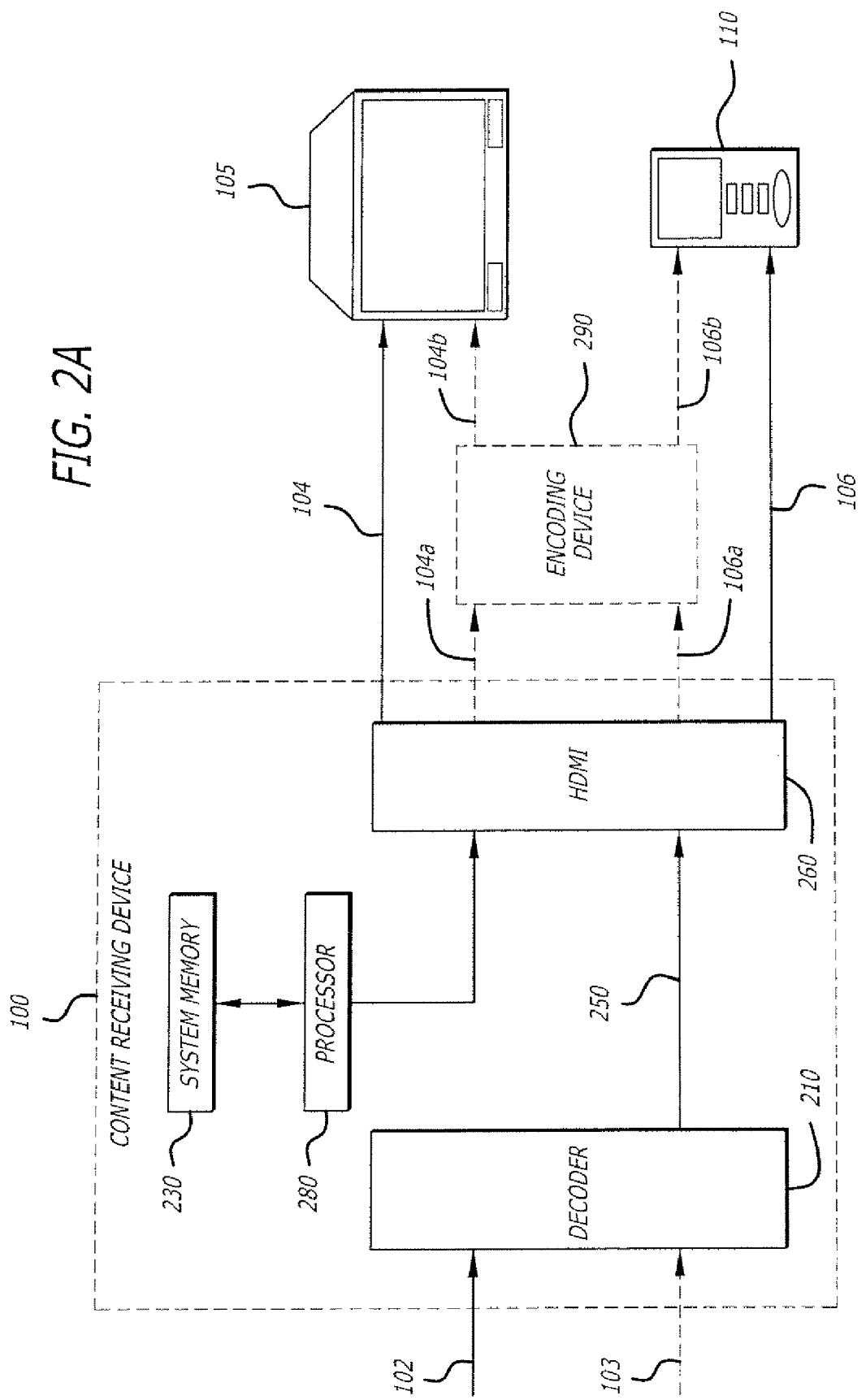

HIGH DEFINITION MULTIMEDIA INTERFACE TRANSCODING SYSTEM

CROSS-REFERENCE TO RELATED APPLICATIONS

This application claims the benefit of priority on U.S. Provisional Patent Application No. 60/831,767, filed on Jul. 18, 2006.

FIELD

Embodiments of the invention relate to signal processing, and more particularly, to the control of re-encoding or transcoding of content.

BACKGROUND

The transmission of audio-video content from a service provider to subscribers in a protected format, such as encrypted television programs via cable, telco or satellite, is in widespread use today. Currently, the majority of the content is encoded with the MPEG2 codec while the trend is to encode more and more, especially high definition programs, with the Advanced Video Codec (AVC) and Video Codec 1 (VC1) codecs which are more efficient with bandwidth and storage. Generally, there are various steps to protect the content along the way.

Prior to transmission, the protected data is conditional Access (CA) or Digital Right Management (DRM) encrypted. On receipt by the cable, telco or satellite set-top box, the content is either CA or DRM descrambled. If the set-top box has a built-in hard disk drive or DVD recording unit, and copy protection allows, then it may be securely recorded locally for playback at a later time. With either real-time reception or playback from the hard disk drive, the content is then decompressed. Decompressed content that is copy protected is encrypted prior to its output over a link to the display such as a television.

For instance, if the link is either High Definition Multimedia Interface (HDMI) or Digital Visual Interface (DVI), the uncompressed digital content is copy protected using scrambling and High-Bandwidth Digital Content Protection (HDCP). Scrambling is not applied to un-copy protected content. When HDCP is applied, the default copy protection is "copy never". This restricted copy protection mode allows the content to be rendered on a display device, such as a stationary television set for example, but does not allow the content to be copied onto another medium. As a result, no copy control information passed since only "copy never" protection is allowed. On the display side, no persistent copies can be made. The content may only be temporarily buffered to allow for signal process, e.g. graphics overlay prior to display.

A growing problem in the foregoing approach is an increasing number of program viewing options available to a user such as certain portable viewing devices. For instance, a portable digital versatile disc (DVD) and BLU-RAY DISC® player, the Sony® PSP®, the Sony® MYLO™, and Sony/Ericson cellular telephones all feature video playback capability. To record received content for these portable viewing devices, the content must typically be scaled for the size and resolution of the screen and encoded using the supported codec. The uncompressed, high definition capable, digital content output from an HDMI or DVI interface would be an ideal, universal source of digital contents from which to re-encode from. Unfortunately, the default "copy no more" status of HDCP prevents the storage of content into portable formats (and by inference the re-encoding or transcoding of content to achieve those formats). This precludes the user from being able to enjoy the programming on these alternate devices.

Accordingly, there is a need to provide a user with the universal ability to securely re-encode uncompressed digital content, and record it for future playback and viewing on portable and other devices.

BRIEF DESCRIPTION OF THE DRAWINGS

Embodiments of the invention may best be understood by referring to the following description and accompanying drawings that are used to illustrate various features of the embodiments of the invention.

FIG. 2A illustrates an exemplary embodiment of the set-top box and its communications with an encoding device and content playback devices.

DETAILED DESCRIPTION

Figure 1:
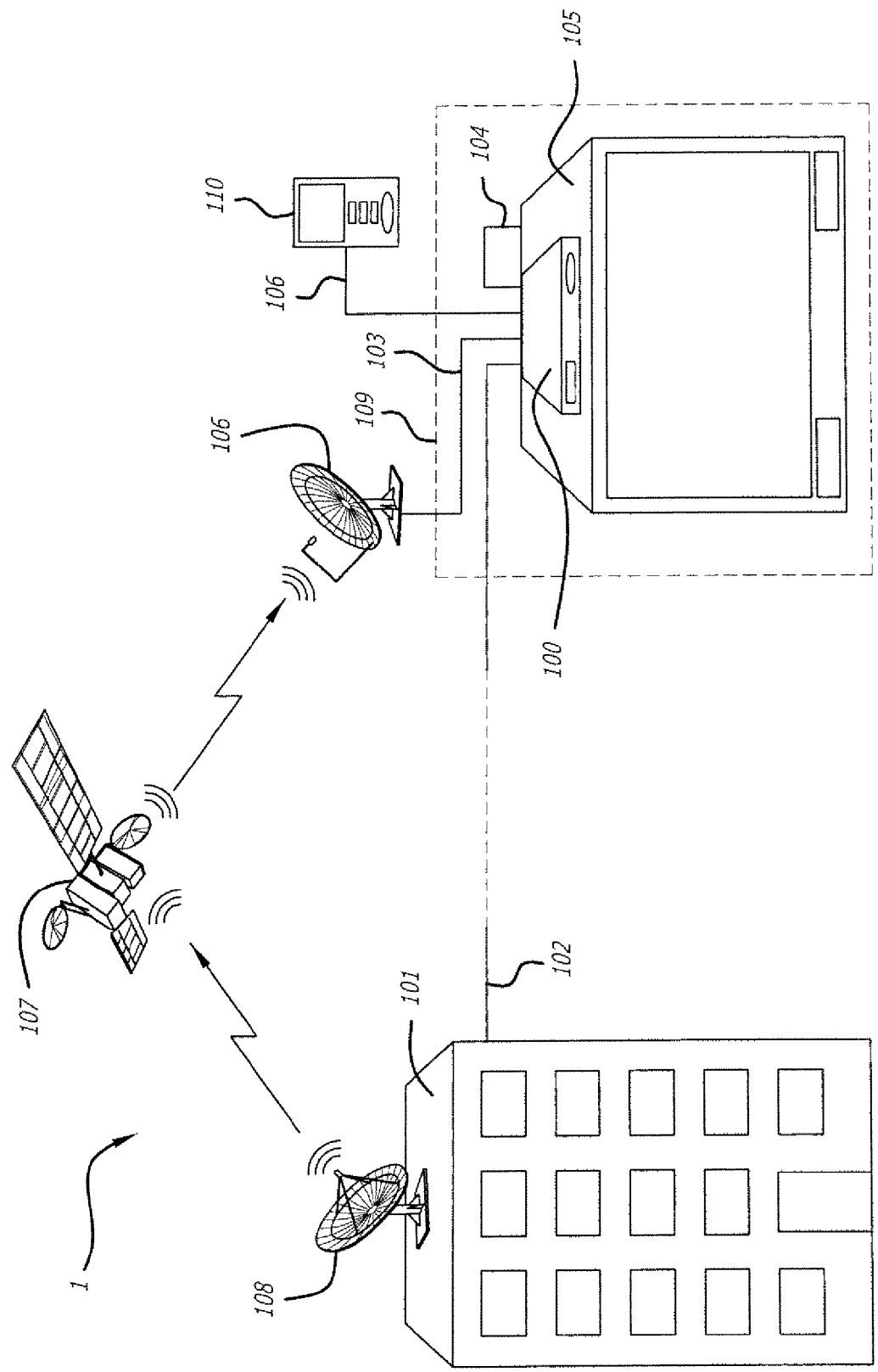
FIG. 1 illustrates an exemplary environment in which embodiments of the invention may be practiced.

Embodiments of the invention generally relate to a system and method for controlling the usage of content such as the encoding and storage of received, uncompressed digital audio-video (AV) content. The encoding and storage of the content may be accomplished through transmission of usage rules prior to or concurrently with the content. The "usage rules" feature information that is used to control encoding operations, and also, to control the playback of this encoded content. For instance, these usage rules may be configured to allow any codec to re-encode content without foreknowledge of what codec is selected by providing a list of permissible compression resolutions, frame rates, and the like.

Herein, embodiments of the invention may be associated with the operations of an encoding device that may be ill communication with or implemented within a content playback device. The audio-video content of the decoded (e.g., decompressed) signal is provided to an encoding device, and control of playback of the audio-video content is passed from the source decoding device to the encoding device.

As illustrative examples, one embodiment of the invention is directed to a system and technique for controlling playback, storage, decoding and output of content through usage rules securely transferred to a content encoding device implemented as part of a standalone encoder and recorder, digital television, set-top box, a portable video game unit, or the like.

According to one embodiment of the invention, the connector may be adapted with a high definition multimedia interface (HDMI) and modified copy protection protocol and implemented as part of a content receiving device (e.g., standalone encoder and recorder, digital television, set-top box, content recording device, etc. Therefore, the encoding and recording operation may be separated from playback. As a result, the playback device would not need an encoder.

According to another embodiment of the invention, a content delivery system comprises a decoder and a high definition multimedia interface (HDMI) to receive audio-video content and to output the audio-video content in accordance with a first mode for allowing one or more copying operations to be performed on the outputted audio-video content, and a second mode, possibly for legacy HDMI/HDCP operation, for preventing further copying of the outputted audio-video content, According to yet another embodiment of the invention, a content delivery system comprises a first display device, and a high definition multimedia interface (HDMI) compatible with a first content playback device and a second content playback device. The second content playback device features a monitor that displays video at a different resolution than video displayed at the first content playback device. The HDMI is adapted to output the received audio-video content to an encoding device that enables playback on both content playback devices accounting for viewing resolution differences.

As a result, the HDMI (copy protected, decompressed video and/or audio) interface is adapted to use an enhanced security protocol, possibly digital rights management (DRM), to protect audio-video content from the television or set-top box to another device that is not a "typical display synch" device like a monitor or television. The other device may be adapted to accept digital decompressed content (e.g., from the HDMI connector) and to encode the content (e.g., MPEG-4 from Moving Picture Experts Group, Advanced Video Coding "AVC", VC-1, etc.) and/or perform downward resolution at the same time. The encoding device maintains the security of the incoming decompressed content stream and/or applies new DRM encryption on the content as it is being recorded. The compressed, protected content is written to a Sony® Memory Stick or suitable portable media, or portable storage device with built-in storage, e.g. hard disk drive or flash memory.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the various embodiments of the invention. For example, the term "set-top box" describes a device that receives the stream of data from an external source, such as a radio or television station, in a variety of ways: (1) via wireless transmissions including satellite or even an ordinary Very High Frequency (VHF) or Ultra High Frequency (UHF) antennas; or (2) via wire-based transmissions, such as via an Ethernet or coaxial cable, digital subscriber line or even a telephone line. A set-top box accesses audio-video content in the received data stream and outputs the accessed content for playback on a user's content playback device.

The term "encoding device" constitutes any device that is configured to compress audio-video (AV) content using a video codec such as Advanced Video Coded (AVC) or Video Codec 1 (VC1). Also, audio may be compressed using a codec such as MP3, Dolby AC3, AAC, and the like. For the purposes of this discussion, the encoding may involve encoding of video and/or audio.

The term "content playback device" constitutes any device that is configured to playback audio-video (AV) content, "Audio-video content" (or AV content) constitutes audio and/or video data. This data may be associated with television or radio programming. Examples of content playback devices include, but are not limited or restricted to video game players, video game consoles, computers, cellular telephones, televisions, music players, video players, or the like. Content playback devices may be portable or stationary.

The term "software" generally denotes executable code such as an operating system, an application, an applet, a routine or even one or more instructions. The software may be stored in any type of memory, namely suitable storage medium such as a programmable electronic circuit, a semiconductor memory device, a volatile memory (e g., random access memory, etc.), a non-volatile memory (e.g., read-only memory, flash memory, etc. an optical disk (e.g., compact disk, digital versatile disc "DVD", or Blu-Ray Disc®), a drive (e.g., hard drive, flash drive, etc.), tape, or the like.

The tern "copy no more" as used throughout the detailed description refers to the copy protection of audio-video content by not allowing copying of the audio-video content into another medium.

With reference to FIG. 1, an exemplary content delivery system 1 is shown in which embodiments of the invention may be practiced in the context of a content receiving device such as a set-top box 100 (e.g., cable, telco and/or satellite receiver box). As shown in FIG. 1, set-top box 100 at a user's location 109 (e.g., residence) receives a stream of data containing audio-video content from a signal source 101. For this illustrative embodiment, the audio-video content is programming broadcasts received from a signal source 101. Examples of signal source 101 may include a television broadcasting system, a head-end of a cable system, a telco IPTV center, satellite uplink, an Internet Service Provider, or even a device responsible for distributing signaling from its original source.

Set-top box 100 is adapted to receive data from signal source 101 in variety of ways, such as via wireless transmissions 103 including a satellite dish receiver 106 in communication with signal source 101 via a satellite 107 and satellite dish transmitter 108. Alternatively, set-top box 100 may receive the stream of data from signal source 101 via wire-based transmissions 102, such as via an Ethernet or coaxial cable, digital subscriber line or ever, a telephone line. Although not shown, set-top box 100 may also receive the stream of data from a Very High Frequency (VHF) or Ultra High Frequency (UHF) antenna.

It is contemplated that the received data may be a stream of digital data. Of course, it is contemplated that the received data may be analog baseband video and audio, where the audio-video is digitized within set-top-box 100.

Herein, set-top box 100 accesses programming content in a received stream of data and outputs audio-video (AV) content for re-encoding and subsequent playback on a user's content playback devices 105 and/or 110. As shown, AV content is provided to a stationary playback device 105 (e.g., a television) via interconnect 104 and provided to a portable re-encoding and playback device 110 (e.g., a portable digital video player, cellular telephone with audio-video playback capabilities, etc.) via interconnect 106. The device can record the AV content and also render it for display. Interconnects 104 and 106 are illustrated as a wire-based medium such as cables, although interconnects may be wireless pathways using infrared, radio frequency (RF) signaling, or any other wireless signaling.

As shown in FIG. 2A, an exemplary embodiment of internal logic within set-top box 100 and communications with content playback devices 105 and 110 are shown, Herein, a decoder 210 receives encoded digital data as wired-based transmissions 102 and/or wireless-based transmissions 103 as represented by dashed lines. Decoder 210 receives the encoded digital data, such as audio-video content in a first format, decodes the digital data, and routes the decoded (uncompressed) digital data 250 to high definition multimedia interface (HDMI) connector 260.

According to this embodiment of the invention, as represented by dashed line, set-top box 100 is in communication with an encoding device 290. As shown, encoding device 290 is separate from HDMI connector 260, and performs re-encoding operations on uncompressed content (serial data) received from HDMI connector 260. Herein, HDMI connector 260 is used to output uncompressed content outside of set-top box 100 to encoding device 290.

According to one embodiment of the invention, encoding device 290 receives digital, uncompressed data from HDMI connector 260 and controls the usage of such data. As an example, encoding device 290 may include re-encode functionality (e.g., encoding software or an internal encoder) that encodes digital data 250 from a first format into a second format recognized and utilized by content playback device 105 and/or 110. Such re-encoding operations may be controlled by one or more usage rules as described below and illustrated in FIGS. 5-7, 8A and 8B.

Although not shown, encoding device 290 may be implemented with logic that controls re-encoding operations. Such re-encoding may be in accordance with usage rules output from HDMI connector 260 or may be in accordance to greater restrictions that outlined by the usage rules supplied by HDMI connector 260 (e.g. from restrictions due to licensing of HDMI or the enhanced HDCP protocol, etc.).

Hence, content that does not require re-encoding is provided to content playback devices 105 and 110 via interconnects 104 and 106, respectively. However, content that requires re-encoding is provided to encoding device 290 via interconnects 104a and 106a and routed to content playback devices 105 and 110 via interconnects 104b and 106b, respectively.

It is contemplated that one embodiment of the invention uses a Universal Serial Bus (USB) or USB2 interface to accept the content back from encoding device 290, if that scenario is enabled, for storage on a hard drive or portable memory device such as a memory stick or flash drive. The re-encoded content might be stored along with the original compressed content, such as on the hard drive or the first player, for example.

Of course, it is contemplated that the functionality of encoding device 290 may be implemented with logic of set-top box 100. As a result, the re-encoding operations described above would be performed by logic within set-top box 100. However, there are instances where the transcoding resources are not available in the set-top box 100. It is hard to foresee what new codecs will be needed or in use in the future. The various embodiments of the invention allow for a universal way to output uncompressed digital content so it may be externally re-encoded in a protected way.

Figure 2B:
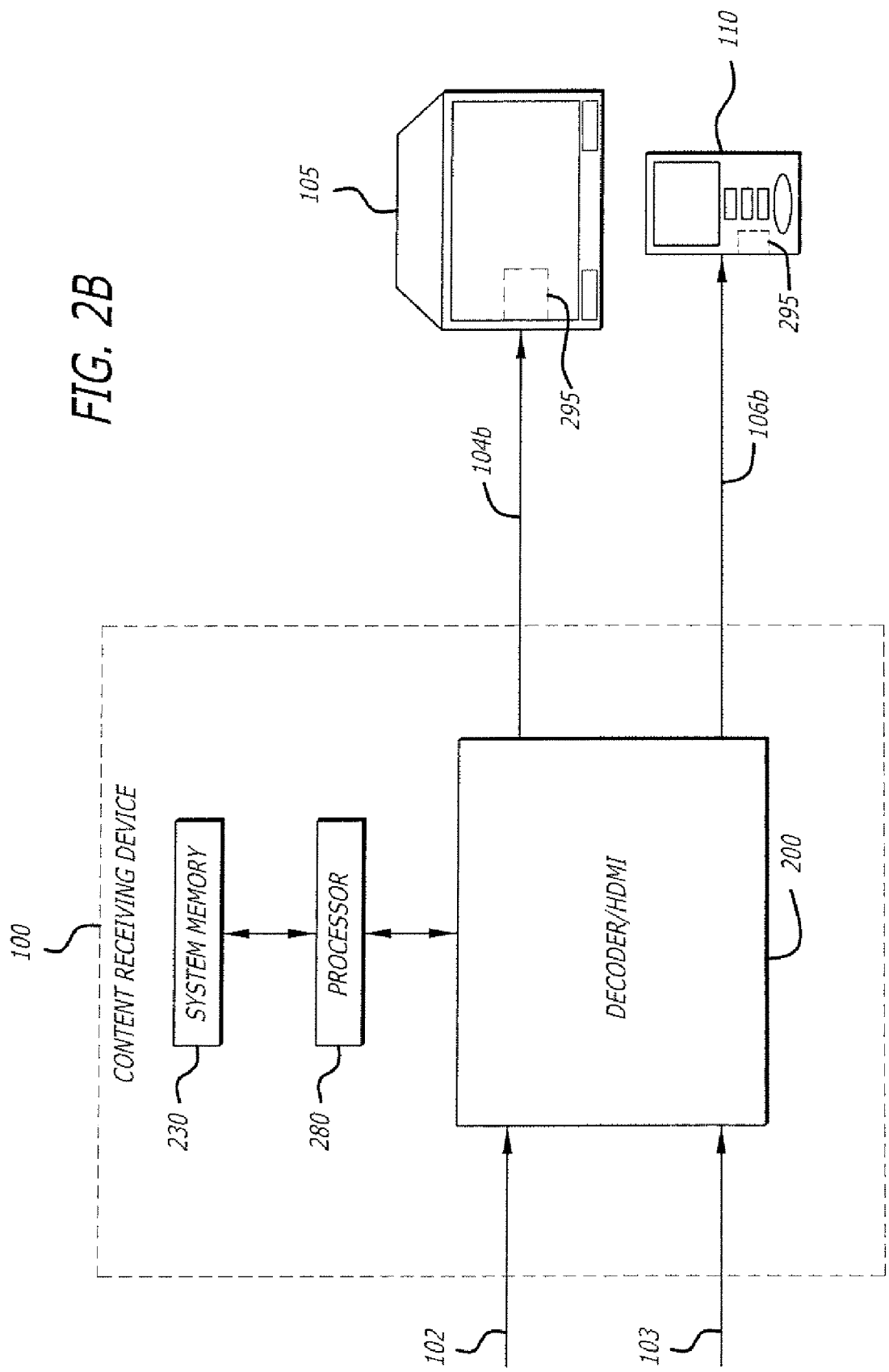
FIG. 2B illustrates an exemplary embodiment of the set-top box and its communications with encoding devices implemented within one or more content playback devices.

As shown in FIG. 2B, the set-top box 100 may feature one or more component 200 that performs decoding and HDCP functionality and outputs an uncompressed digital signal from a connector to content playback devices 105 and 110 via interconnects 104b and 106b, respectively, However, according to this embodiment of the invention, each content playback device 105 and 110 features an encoder 295 that is adapted to re-encode (transcode from the earlier format 102) content for use. Examples of the content playback devices 105 and 110 may include, but are limited or restricted to a SONY® PSP type (which renders at $\frac{1}{16}$ high definition resolution) or other portable device such as a cellular telephone (which renders at $\frac{1}{32}$ high definition resolution) with video and/or audio playback. For video playback, as described above, these portable devices actually display video at a resolution lower than a standard definition display (which renders at $\frac{1}{4}$ high definition resolution) or high definition display on a television. So, down-resolution re-encoding (transcoding from the earlier format 102) operations may be necessary in controlling the usage of such content, and thus, usage rules allowing for a reduction in resolution can be supplied to the content playback device with the audio-video content.

Security for HDMI-based communications may be modified to accommodate transcoding issues present at encoder 295, namely whether or not content can be encoded, and if so, possibly to what formats (VC-1 only, AVC, etc.). Although, an advantage of the invention is that the first playback device does not need to know about the codec used by the encoder 295. If the content can be encoded, then encoder 295 may be used to determine to what resolution can be content be encoded (increasing, decreasing or maintaining the resolution), and whether protection needs to be re-applied to the resulting compressed content (either copy protection, e.g. DTCP, or full-bloom DRM such as Marlin™, Microsoft Windows Media® DRM, Real Networks HELIX®, etc.). The protocol is enhanced by sending this additional information through usage rules as described below.

Figures 3A, 3B:
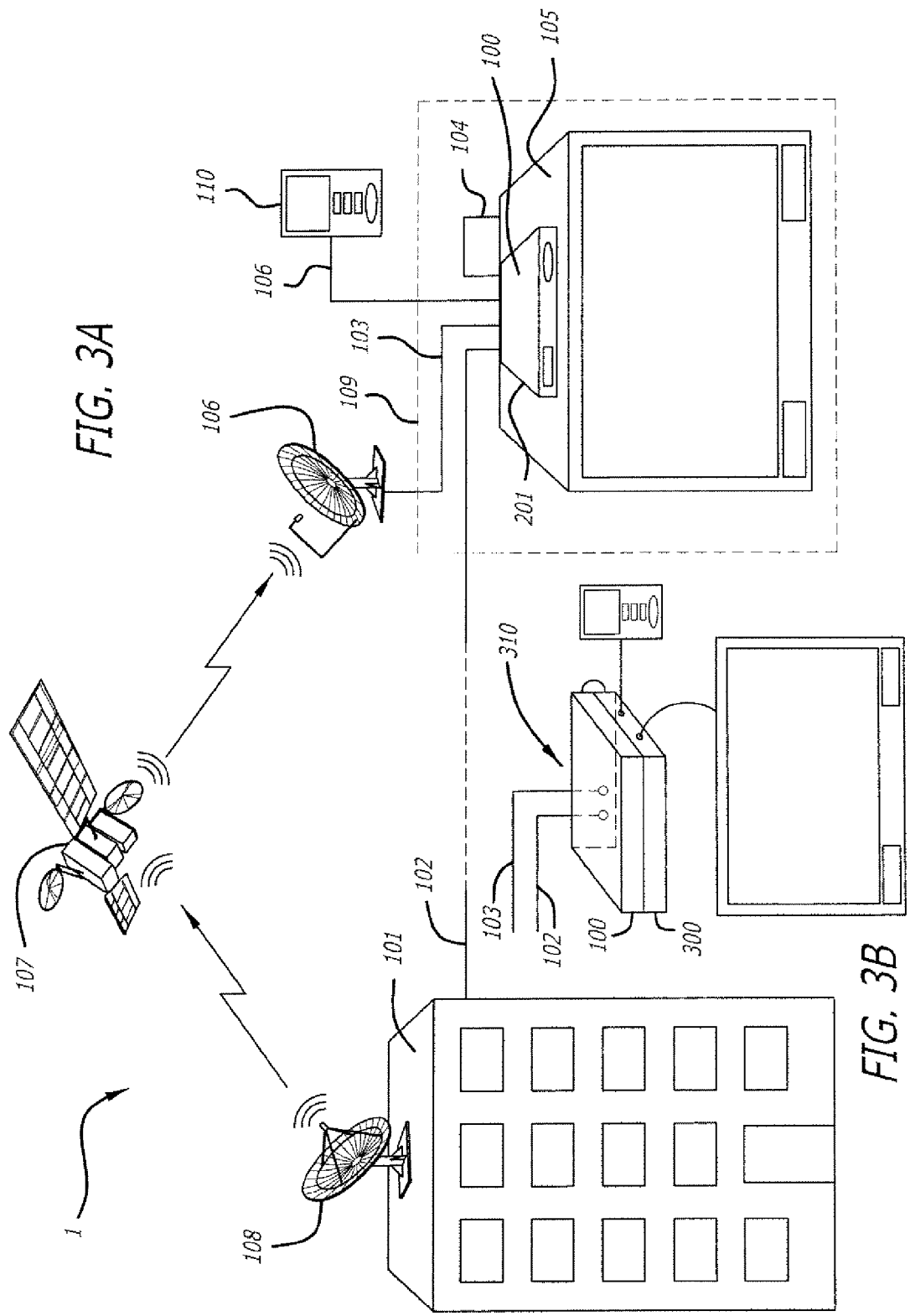
FIGS. 3A-3B illustrate a second exemplary embodiment of the content delivery system in which embodiments of the invention may be practiced.

Referring now to FIGS. 3A and 3B, a more detailed embodiment content delivery system 1 implemented with a content receiving device configured in accordance with an embodiment of the invention is shown. Content receiving device is implemented as an audio-video (AV) recording device 300 in communication with set-top box 100 for example. Set-top box 100 receives data from signal source 101. Transmitted via wired-based transmissions 102 or wireless transmissions 103, the data includes audio-video content that is obfuscated by conditional access or DRM scrambling or other techniques used to prevent the audio-video (AV) content from being accessible in the clear.

According to one embodiment of the invention, upon receiving, descrambling, if need be, and copy protecting the data, the encoded AV content may be loaded into AV recording device 300 via interconnect 310 for storage and subsequent retrieval and playback. Herein, AV recording device 300 is illustrated as a personal video recorder (PVR) to store AV content such as television programming inclusive of pay-per-view movies. it is contemplated that playback of the AV content on portable content playback device 100 may be desirable.

Figure 4:
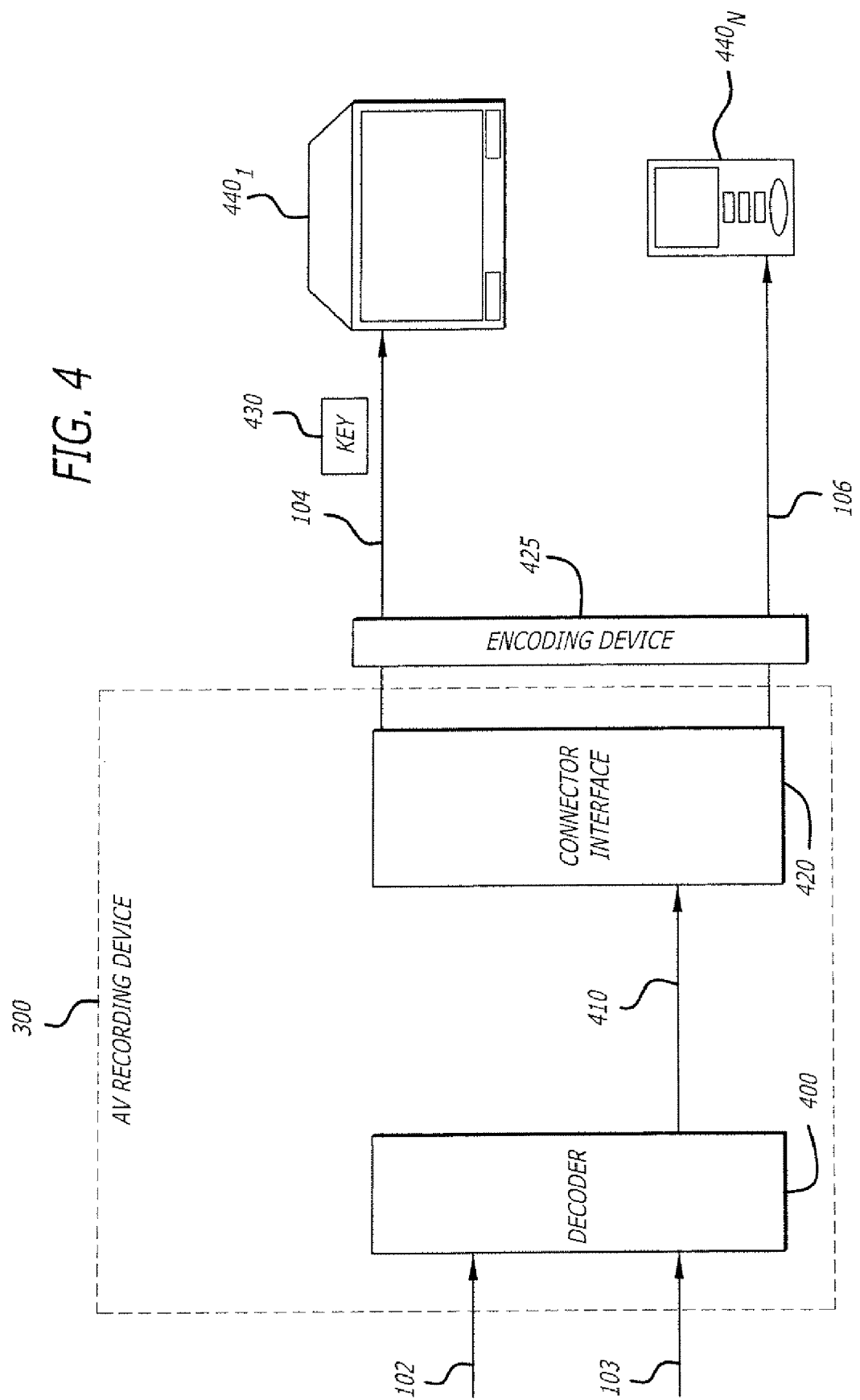
FIG. 4 illustrates an exemplary embodiment of the AV recording device and its communications with an encoding device and one or more content playback devices.

As shown in FIG. 4, AV recording device 300 comprises a decoder 400 that is adapted to decode the audio-video content and route the decoded (uncompressed) audio-video content 410 to a connector interface 420 to output audio-video content 410. Directly or indirectly coupled to connector interface 420, an encoding device 425 featuring logic to control the usage of audio-video content 410 by generating an exchange key 430 that includes usage rules and/or revocation information is shown. Exchange key 430 is provided to one or more (N≧1) content playback devices $440_1$-$440_N$. Herein, the usage rules placed within exchange key 430 are based on usage rules supplied with audio-video content via connector interface 420, or may be derivations of these usage rules with different usage restrictions (e.g., more restrictive copy protection, etc.). It should be noted that the mechanisms for adding usage rules with an exchange key 430 can be added to the existing HDCP protocol which uses an exchange key mechanism, used with the HDMT and DVI connectors, to enhance it so that it may allow for re-encoding and recording purposes by sync devices.

Within exchange key 430, the usage rules and/or revocation information control how the audio-video content is used. For instance, the usage rules may limit the number of times that the audio-video content can be played back. The usage rules may limit the time frame for playback of the audio-video content or may prohibit certain re-encoding from one resolution to another. Part of the usage rules may also entail a revocation list. A revocation list consists of a list of compromised devices to which protected content should not be output. The revocation list may also list revoked security technology which may no longer be used to output content. As an example, the audio-video content may be re-encoded from a first mode of operation (HDCP copy permissible format such as "copy once") to a second mode of operation (HDCP copy-protected format such as "copy no more"). Also, audio-video content may be re-encoded from a first mode supporting a higher-resolution display, e.g. standard definition, to a second mode supporting a lower-resolution display, e.g. Sony PSP which is 1/16 high definition or 1/4 standard definition.

According to one embodiment of the invention, the usage rules may be device-specific so that each transmission to a particular content playback device features usage rules associated with that device. As a result, encoding device 425 determines the targeted content playback device prior to transmitting the audio-video content. This may be accomplished through a number of techniques. For instance, signaling may be conducted between encoding device 425 and the targeted content playback device(s) (e.g., device $440_1$) to determine its identity. In lieu of such signaling, usage rules may include identifiers for targeted playback content device(s) or the usage rules may be encrypted as part of exchange key 430 as described below.

As describe above, the revocation information, as part of a revocation list, may be used to restrict further output of data having compromised (unsecured implementations and formats, or to prevent certain content playback devices from playing or further transmitting the incoming audio-video content. The revocation information would be provided to logic controlling DRM functionality for the content playback devices in order to assess a proposed output format of the AV content, an identity of the content playback device (e.g., serial number, static address, etc.), or any other information needed to control usage in accordance with the revocation scheme.

Of course, it is contemplated that re-encoded content can be created while playing back content. It is contemplated that content could be delivered by encoding device 425 while playing back different content on another interface. Hence, the re-encoding is performed in the background and concurrently with the playback operations.

Moreover, encoding device 425 might be able to re-encode content (for storage back to itself or external storage) while content playback device $440_1$ is "turned off" and the particular connector associated with connector interface 420 (e.g., HDMI connector) is not in use by the user. Ideally, the interface could be also accelerated to faster than real-time in order to expedite re-encoding.

Figure 5:
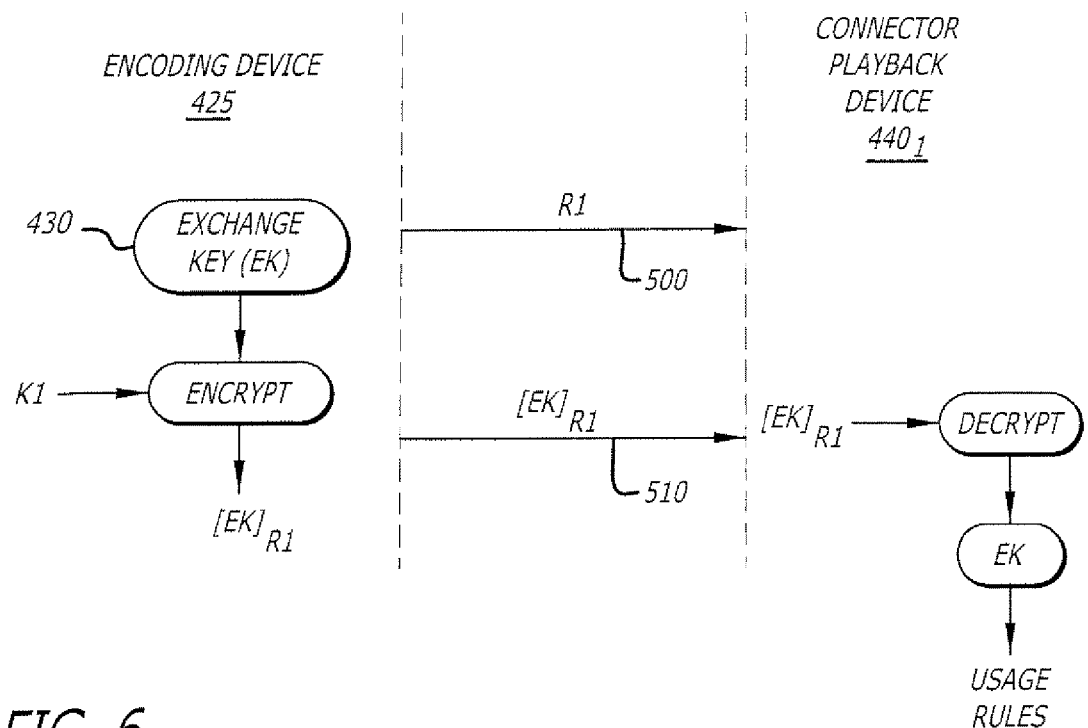
FIG. 5 illustrates an exemplary embodiment of an information exchange to establish secure communications between the encoding device of FIG. 4 and a content playback device.

Referring now to FIG. 5, an exemplary embodiment of an information exchange to establish secure communications between encoding device 425 and a content playback device $440_1$ of content delivery system is shown. Encoding device 425 initiates communications by generating a first random number (R1) 500 and transmitting first random number 500 to content playback device $440_1$. This transmission of first random number 500 may be in the clear or obfuscated using some encoding or encryption technique. For instance, first random number 500 may be encrypted with a public key assigned to content playback device $440_1$ if public key cryptography is supported. Alternatively, first random number 500 may be placed into a digital certificate that is signed with a private key of a trusted source issuing the digital certificate (where the public key of the trusted source is well known) or first random number 500 may be placed into a digital signature encoding device 425.

After being provided to content playback device $440_1$, first random number 500 (or a portion or derivation thereof) may be used to encrypt exchange key 430 to create an obfuscated exchange key 510 to ensure secured transmission of exchange key 430 to content playback device $440_1$. Upon receipt of obfuscated exchange key 510, usage rules may be recovered by content playback device $440_1$ to ascertain any changes in digital rights management rights for the incoming AV content.

Figure 6:
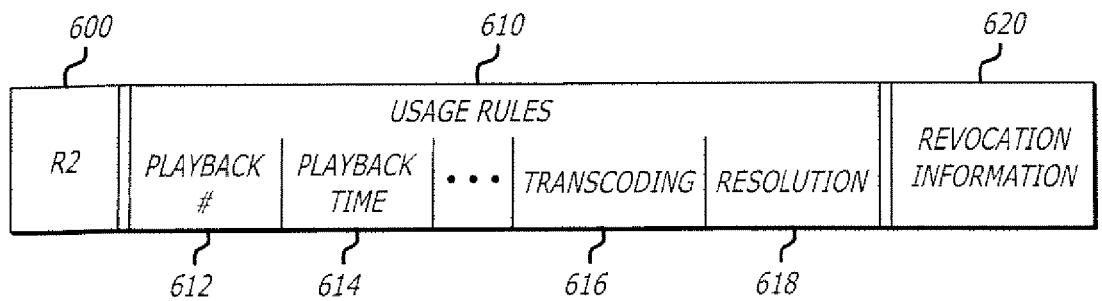
FIG. 6 illustrates an exemplary embodiment of the exchange key.

As shown in FIG. 6, exchange key 430 comprises a second random number 600, usage rules 610, and optionally revocation information 620. According to one embodiment of the invention, second random number 600, usage rules 610, and perhaps revocation information 620 are encrypted with first random number 500. Of course, it is contemplated that such encrypted may be performed with a portion or derivation of first random number 500 in lieu of performing such encryption using first random number 500 in its entirety.

Random number 600 is an adjustable value, where the adjustment may be made in a periodic (e.g., time-based) or non-periodic manner. Also, by providing a dynamic variable, any resultant keys generated from exchange key 430 are dynamic to enhance security of the content delivery system.

Usage rules 610 include information that controls the usage of the incoming AV content. As an illustrative embodiment, usage rules 610 may include information that sets the number of times the AV content may be played back 612 and/or sets when such playback may occur 614. Usage rules 610 may allow or prevent certain transcoding operations 616 or certain adjustments in display resolution at the content playback device 618. For instance, the usage rules may allow for a reduction in resolution of the AV content before playback. This allows content playback devices featuring monitors supporting lower display resolution than intended for the original AV content to properly display the AV content.

As an optional element within exchange key 430, revocation information 620 includes information that can be used to control the playback format of the incoming audio-video content as well as preclude such playback and/or subsequent transfer.

Figure 7:
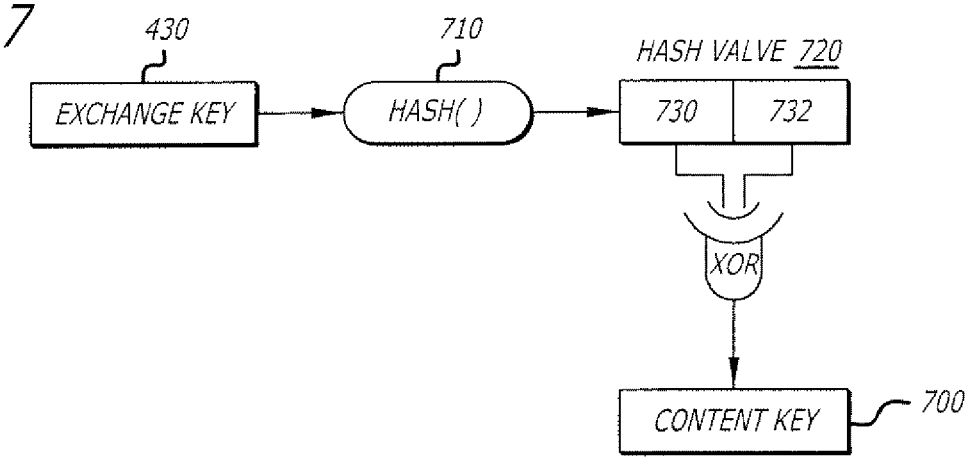
FIG. 7 illustrates an exemplary embodiment of a content key that may be used as an obfuscation key or to produce the obfuscation key.
Figure 8A:
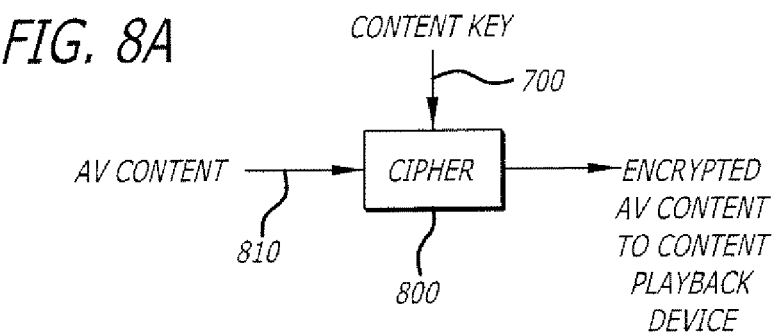
FIGS. 8A and 8B illustrate cryptographic processes to produce cryptographically protected audio-video content.

Referring now to FIG. 7, an exemplary embodiment of a content key 700 that may be used as an obfuscation key or as a value used to produce an obfuscation key is shown. Herein, according to one embodiment of the invention, content key 700 is produced by performing a one-way hash function 710 on exchange key 430 in order to generate a hash value 720. As an illustrative example, if SHA-256 hash function is implemented as one-way hash function 710, hash value 720 is a 256-bit value. Hash value 720 is divided into two separate sub-values 730 and 732, which are XOR'ed together to produce a 128-bit content key 700. Content key 700 may be used as a cryptographic key for a stream cipher 800 through which audio-video content 810 is now cryptographically protected prior to transmission to a content playback device as shown in FIG. 8A.

Figure 8B:
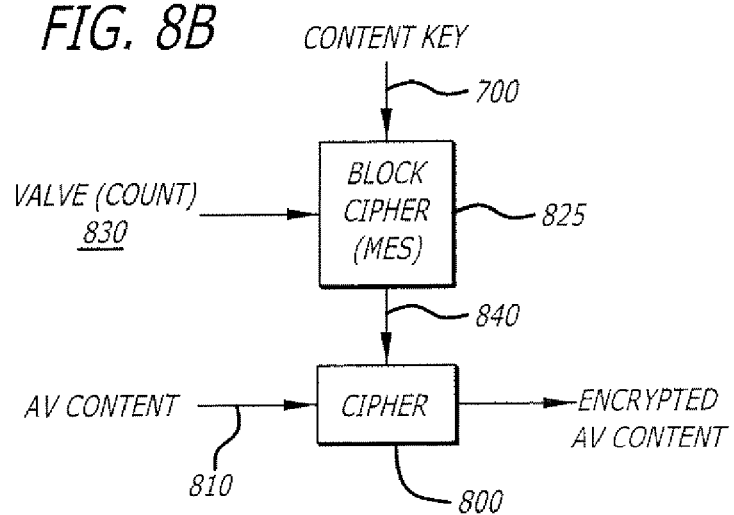

Alternatively, as shown in FIG. 8B, content key 700 may be used as an input into a cipher 820 such as a block cipher like Advanced Encryption Standard (AES). A value 830 that dynamically changes in a periodic or non-periodic manner, such as a count value, is input into cipher 820 along with content key 700. A resultant value 840, referred to herein as an "encryption key" 840, is used as the cryptographic key for stream cipher 800 through which AV content 810 is routed and cryptographically protected.

Figure 9:
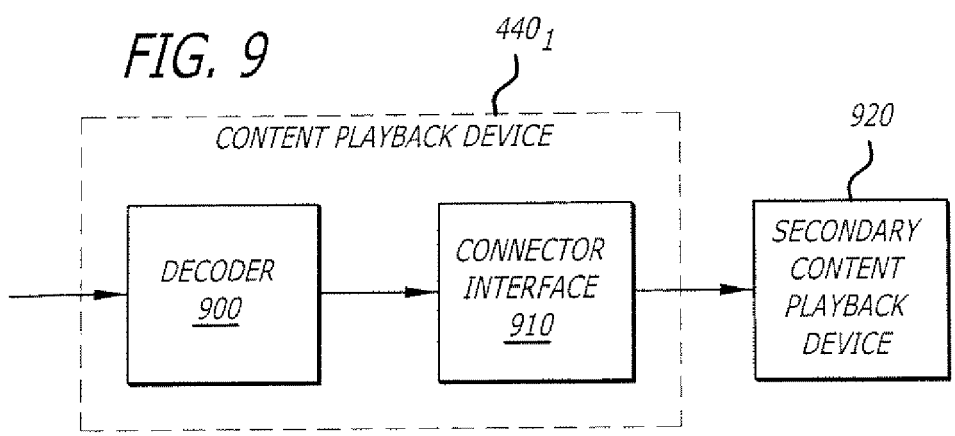
FIG. 9 illustrates an exemplary embodiment of the content playback device in which embodiments of the invention may be practiced.

Referring now to FIG. 9, another embodiment of the invention is shown. Herein, content playback device 440 comprises a decoder 900 and a connector 910 that possess the functionality of encoding device 425 of FIG. 4. Connector 910 is coupled to a secondary content playback device 920 that is adapted to receive AV content within content playback device 440₁. As a result, content playback device 440₁ is adapted to control usage (transcoding, playback restrictions, etc.) of received content routed to secondary content playback device 920 based on the information exchange described above.

It should be noted that the various features of the foregoing embodiments were discussed separately for clarity of description only and they can be incorporated in whole or in part into a single embodiment of the invention having all or some of these features.

While the invention has been described in terms of several embodiments of the invention, those of ordinary skill in the art will recognize that the invention is not limited to the embodiments of the invention described, but can be practiced with modification and alteration within the spirit and scope of the below claims. The description is thus to be regarded as illustrative instead of limiting.

What is claimed is:

1. A system comprising:
a first content playback device including an encoding device to re-encode received content from a first encoding format to a second encoding format in accordance with predetermined usage rules that are specific to a second content playback device being a device having a display and adapted for direct coupling to the first content playback device, wherein the predetermined usage rules of the second content playback device are provided to the first content playback device by an exchange key and enable the encoding device to determine the second content playback device prior to transmitting the content, and wherein the exchange key includes information that identifies a number of times the content can be played back and information to allow or deny transcoding, the first content playback device supporting playback of content in the first encoding format that differs from the second encoding format supported by the second content playback device; and
an interface compatible with the second content playback device, the interface to output the re-encoded content for storage and playback on the second content playback device.

2. The system of claim 1, wherein the first content playback device is a television.

3. The system of claim 2, wherein the second content playback device is a cellular telephone.

4. The system of claim 1, wherein the interface is a High Definition Multimedia Interface (HDMI) connector and the second content playback device is a cellular telephone.

5. The system of claim 1, wherein the first content playback device includes a display and at least one speaker and the second content playback device includes a display and at least one speaker.

6. The system of claim 1, wherein the predetermined usage rules supported by the second content playback device include information that is used to control re-encoding operations by the first content playback device and playback operations by the second content playback device.

7. The system of claim 1, wherein the predetermined usage rules of the second content playback device include a revocation list.

8. The system of claim 1, wherein the encoding device of the first content playback device to apply different usage rules than the predetermined usage rules when re-encoding the content for a content play device different than the second content playback device.

9. The system of claim 1, wherein the encoding device of the first content playback device to further reduces a number of times the content can be played when re-encoding the content for a second content playback device different than the second content playback device.

10. A content receiving device comprising:
an interface; and
an encoding device to re-encode content from a first encoding format to a second encoding format in accordance with predetermined usage rules specific to a first content playback device, being a device having a display and being adapted for coupling to the interface to receive re-encoded content for storage and playback, wherein the predetermined usage rules enable the encode device to identify the first content playback device prior to transmitting the content, control playback of the re-encoded content, and are specific to the first content playback device so that the predetermined usage rules differ from usage rules that are used to control playback of the content on a second content playback device that is different from the first content playback device.

11. The content receiving device of claim 10, wherein the first content playback device is a television.

12. The content receiving device of claim 10, wherein the second content playback device is a cellular telephone.

13. The content receiving device of claim 10, wherein the interface is a High Definition Multimedia Interface (HDMI) connector and the second content playback device is a cellular telephone.

14. The content receiving device of claim 10, wherein the encoding device further reduces a number of times the content can be played when re-encoding the content for a second content playback device different from the first content playback device.

15. The content receiving device of claim 10, is a set-top box.

16. The content receiving device of claim 10, further comprising a memory to store video that is encoded by the encoding device that associates different usage rules depending on a content playback device targeted to receive the re-encoded content.

17. The content receiving device of claim 10, wherein the predetermined usage rules include a revocation list.

* * * * *